US012670629B2

(12) United States Patent
Keller et al.

(10) Patent No.: US 12,670,629 B2
(45) Date of Patent: Jun. 30, 2026

(54) DEVICES AND COMPUTER IMPLEMENTED METHODS FOR ENCODING AND DECODING DATA

(71) Applicant: Robert Bosch GmbH, Stuttgart (DE)

(72) Inventors: Thomas Andy Keller, Amsterdam (NL); Anna Khoreva, Stuttgart (DE); Max Welling, Bussum (NL)

(73) Assignee: ROBERT BOSCH GMBH, Stuttgart (DE)

( * ) Notice: Subject to any disclaimer, the term of this patent is extended or adjusted under 35 U.S.C. 154(b) by 290 days.

(21) Appl. No.: 18/552,404

(22) PCT Filed: Jul. 22, 2022

(86) PCT No.: PCT/EP2022/070581
§ 371 (c)(1),
(2) Date: Sep. 25, 2023

(87) PCT Pub. No.: WO2023/002002
PCT Pub. Date: Jan. 26, 2023

(65) Prior Publication Data
US 2024/0161346 A1 May 16, 2024

(30) Foreign Application Priority Data
Jul. 23, 2021 (EP) .................................... 21187487

(51) Int. Cl.
*G06T 9/00* (2006.01)
(52) U.S. Cl.
CPC .............. *G06T 9/002* (2013.01); *G06T 9/001* (2013.01)

(58) Field of Classification Search
CPC ....... G06T 9/002; G06T 9/001; G06N 3/0455; G06N 3/048; G06N 3/047; G06N 3/084; G06N 3/088
See application file for complete search history.

(56) References Cited

U.S. PATENT DOCUMENTS

2022/0121905 A1* 4/2022 Jeong ....................... G06N 3/08

OTHER PUBLICATIONS

Var image compression, Balle et al 2018 (Year: 2018).*
International Search Report for PCT/EP2022/070581, Issued Oct. 31, 2022.
Srivastava et al., "Variational Inference in Pachinko Allocation Machines," Cornell University, 2018, pp. 1-10.
Qi et al., "Small Data Challenges in Big Data Era: a Survey of Recent Progress on Unsupervised and Semi-Supervised Methods," Cornell University, 2021, pp. 1-24.

(Continued)

*Primary Examiner* — Jianxun Yang
(74) *Attorney, Agent, or Firm* — NORTON ROSE FULBRIGHT US LLP

(57) ABSTRACT

A computer implemented method of encoding data. The method includes providing a first set of parameters that represent at least a part of the data, determining for parameters in the first set of parameters a weighted first sum depending on the parameters that is positive, providing a first parameter that represents at least a part of the data, and determining an encoding of the data depending on a ratio between the first parameter and the first sum or a root of a predetermined order of the first sum.

9 Claims, 3 Drawing Sheets

(56) References Cited

OTHER PUBLICATIONS

Bishop et al., "GTM: the Generative Topographic Mapping," Neural Computation, vol. 10, 1998, pp. 215-234. <https://www.microsoft.com/en-us/research/wp-content/uploads/1998/01/bishop-gtm-ncomp-98.pdf> Sep. 20, 2023.
Hyvärinen et al., "A Unifying Framework for Natural Image Statistics: Spatiotemporal Activity Bubbles," Neurocomputing, vol. 58-60, 2004, pp. 801-806. <https://sci-hub.ru/10.1016/j.neucom.2004.01.130> Sep. 20, 2023.
Hyvärinen et al., "Topographic Independent Component Analysis," Neural Computation, vol. 13, No. 7, 2001, pp. 1527-1558. <https://sci-hub.ru/10.1162/089976601750264992> Sep. 20, 2023.
Kayode Osindero, "Contrastive Topographic Models," Phd Thesis, University of London, 2004, pp. 1-212. <https://discovery.ucl.ac.uk/id/eprint/10100814/1/Contrastive%20topographic%20models%20-%20Energy-based%20density%20models%20applied%20to%20the%20understanding%20of%20sensory%20coding%20and%20cortical%20topography . . . pdf> Sep. 20, 2023.
Welling et al., "Learning Sparse Topographic Representations With Products of Student-T Distributions," Advances in Neural Information Processing Systems, 2003, pp. 1-8. <https://proceedings.neurips.cc/paper_files/paper/2002/file/bb1662b7c5f22a0f905fd59e718ca05e-Paper.pdf> Sep. 20, 2023.
Lecun et al., "MNIST Handwritten Digit Database," ATT Labs [Online], 2010, pp. 1-8. <http://yann.lecun.com/exdb/mnist> Sep. 20, 2023.
Olshausen et al., "Sparse Coding With an Overcomplete Basis Set: a Strategy Employed By V1?," Vision Research, vol. 37, No. 23, 1997, pp. 3311-3325. <https://sci-hub.ru/10.1016/s0042-6989(97)00169-7> Sep. 20, 2023.

* cited by examiner 202 provide set of parameters 204 provide parameter that represents at least a part of the data 206 determine weighted sum 208 encode data 210 decode encoding of the sequence of input data points 212 determine weights and parameters 302 encode part of a sequence of input data points 304 decode to a sequence of predicted data points 306 measure equivariance error

DEVICES AND COMPUTER IMPLEMENTED METHODS FOR ENCODING AND DECODING DATA

FIELD

The present invention relates to a computer implemented method of encoding and decoding data, in particular a Topographic Variational Autoencoder.

SUMMARY

A device and the computer implemented method for encoding data according to the present invention provides a topographically organized deep-latent variable model. The device and the computer implemented for decoding according to the present invention provides a static reconstruction or forward prediction of data with the topographically organized deep-latent variable model. The model may be an arbitrary nonlinear neural network.

According to an example embodiment of the present invention, the computer implemented method of encoding data comprises providing a first set of parameters that represent at least a part of the data, determining for parameters in the first set of parameters a weighted first sum depending on the parameters that is positive, providing a first parameter that represents at least a part of the data, and determining an encoding of the data depending on a ratio between the first parameter and either the first sum or a root of a predetermined order of the first sum. This encoding represents one variable. The order of the root is preferably two, i.e. the root is preferably a square root.

According to an example embodiment of the present invention, the method preferably comprises determining the weighted first sum of even powers of the parameters or odd powers of their absolute values or even powers of their absolute values. The even powers are preferably powers of two.

According to an example embodiment of the present invention, the method of encoding preferably comprises determining a first quantity of the encoding with a first order of the parameters in the first set of parameters and determining a second quantity of the encoding with a second order of the parameters in the first set of parameters. The quantities of the encoding for different orders of the same set of parameters represent variables of joint topologies.

According to an example embodiment of the present invention, the method of encoding preferably comprises providing a second set of parameters, determining for parameters in the second set of parameters a weighted second sum depending on these parameters that is positive, providing a second parameter, determining a third quantity of the encoding of the data depending on a ratio between the second parameter and the second sum or a root of the predetermined order of the second sum. The quantities of the encoding for different sets of parameters represent variables of disjoint topologies.

According to an example embodiment of the present invention, the method of encoding preferably comprises mapping the first set of parameters and/or the second set of parameters to the encoding with an encoder comprising weights for determining the weighted first sum and/or the weighted second sum.

According to an example embodiment of the present invention, the method of encoding preferably comprises training with data that comprises input data points, wherein the training comprises determining with the encoder the encoding for a sequence of input data points, mapping the encoding of the sequence of input data points with a decoder to a sequence of predicted data points, wherein the encoder comprises first encoder parameters for mapping the sequence of input data points to the first set of parameters and the second set of parameters, wherein the encoder comprises second encoder parameters for mapping the sequence of input data points to the first parameter and the second parameter, wherein the decoder comprises decoder parameters for mapping the encodings of the sequence of input data points to a sequence of predicted data points, and wherein the method comprises determining the weights, the first encoder parameters and/or the second encoder parameters and/or the decoder parameters depending on a difference between an input data point at a predetermined position in the sequence and a data point that is predicted at the predetermined position in the sequence of predicted data points or depending on a difference between an input data point at a predetermined position in the sequence and a data point that is predicted for a different position than the predetermined position in the sequence of predicted data points.

According to an example embodiment of the present invention, the method of decoding data comprises determining the encoding for a sequence of input data points with the method of encoding and mapping the encoding with a decoder to at least one data point, wherein the decoder comprises decoder parameters for mapping the encodings of the sequence of input data points to the at least one predicted data point.

According to an example embodiment of the present invention, the method of decoding preferably comprises training the decoder with the training described above.

According to an example embodiment of the present invention, in the method of encoding or decoding, the data may comprise a plurality of input data points, wherein an input data point represents a sensor signal or a digital image, wherein the method comprises receiving the input data points from or capturing the input data points by a sensor, in particular an image sensor, a video sensor, a radar sensor, a LiDAR sensor, an ultrasonic sensor, a motion sensor, and determining the representation thereof, and/or wherein the method comprises determining at least one predicted data point by decoding the representation thereof and determining a control signal depending on the at least one predicted data point in particular for a physical system, preferably for a computer-controlled machine, a robot, a vehicle, a domestic appliance, a power tool, a manufacturing machine, a personal assistant or an access control system, a system for conveying information, a surveillance system, a medical system or a medical imaging system.

According to an example embodiment of the present invention, a device for encoding data, comprises an encoder that is configured for executing steps in the method of encoding.

According to an example embodiment of the present invention, a device for decoding data, comprises the device and a decoder that is configured for executing steps in the method of decoding.

Further advantageous embodiments of the present invention are derivable from the description herein and the figures.

DETAILED DESCRIPTION OF EXAMPLE EMBODIMENTS

Figure 1:
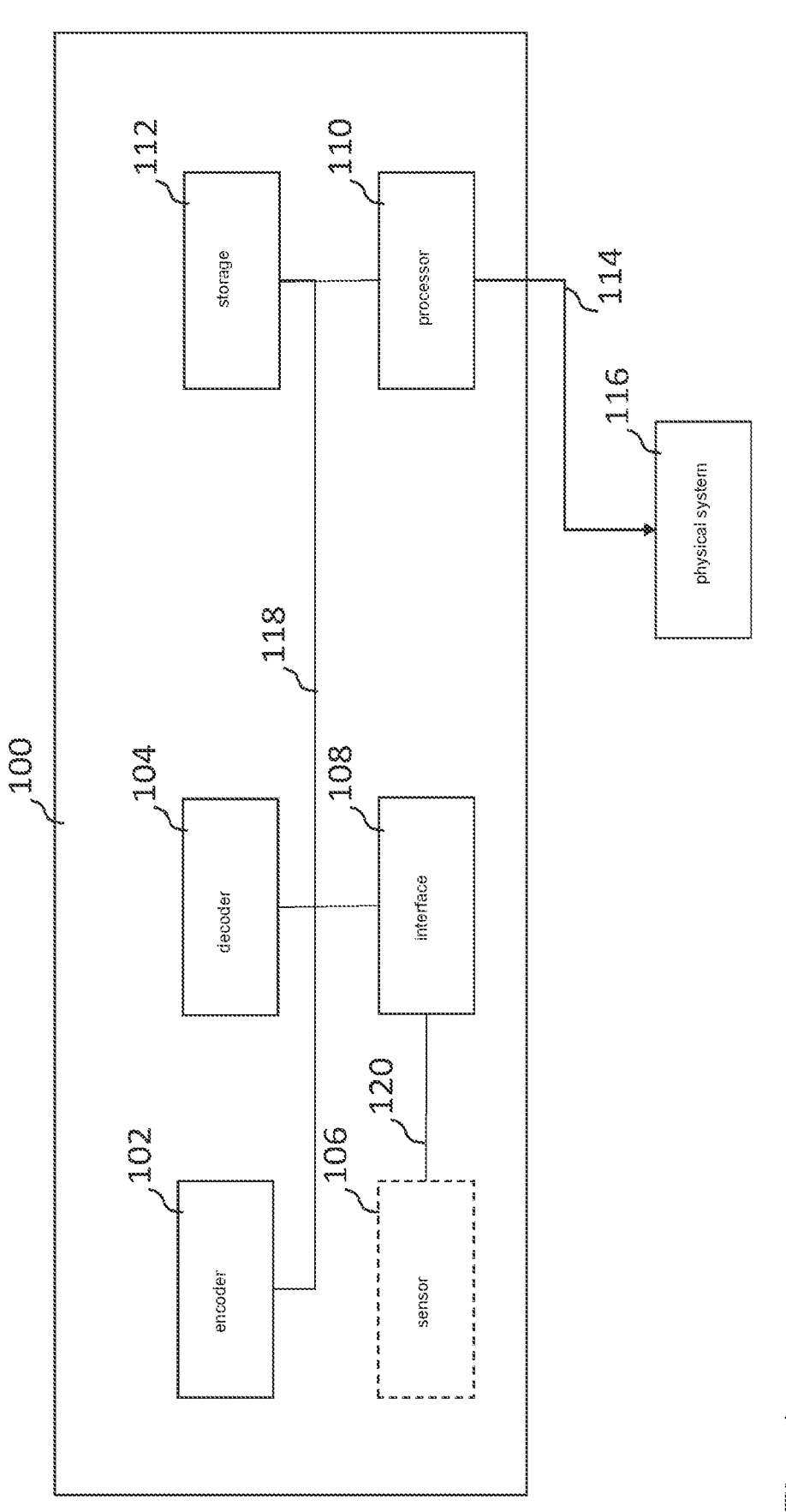
FIG. 1 schematically depicts an apparatus for processing data, according to an example embodiment of the present invention.

FIG. 1 depicts an apparatus 100 for processing data.

The apparatus 100 comprises a device 102 for encoding data.

The apparatus 100 comprises a device 104 for decoding data.

Figure 2:
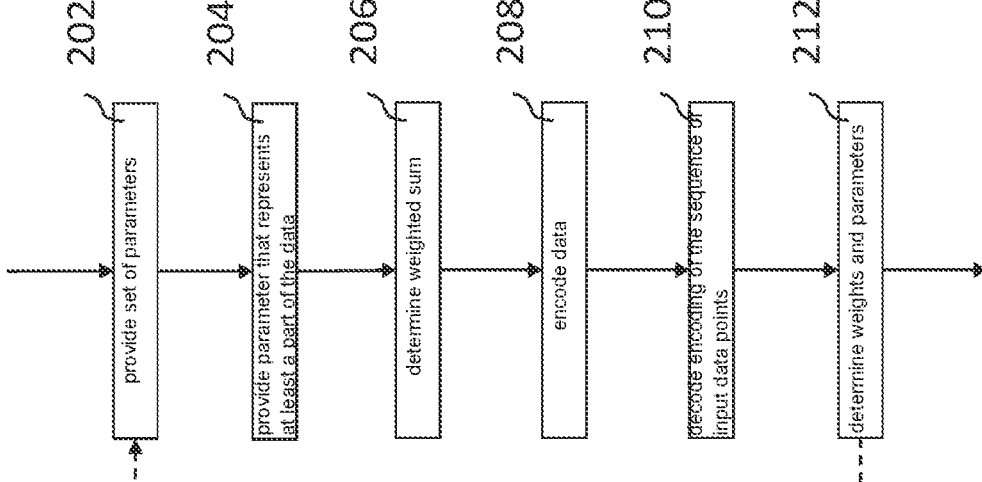
FIG. 2 depicts steps in a method for processing data, according to an example embodiment of the present invention.

The device 102 for encoding data comprises an encoder that is configured for executing steps in a method that is described below with reference to FIG. 2.

The device 104 for decoding data comprises a decoder that is configured for executing steps in the method that is described below with reference to FIG. 2.

The encoder and the decoder in the example are configured as parts of a topographic variational autoencoder.

The apparatus 100 may comprise a sensor 106 or an interface 108 for a sensor 106. The apparatus 100 may receive and process sensor signals, for example from an image sensor, a video sensor, a radar sensor, a LiDAR sensor, an ultrasonic sensor, a motion sensor. The apparatus 100 and the method will be described below by an example for image processing. The apparatus and the method may be configured to process input to the apparatus from any other of the sensors alike.

The apparatus 100 may comprise a processor 110 and storage 112. The apparatus may be configured to compute and output via a link 114 a control signal for a physical system 116, e.g. for a computer-controlled machine, like a robot, a vehicle, a domestic appliance, a power tool, a manufacturing machine, a personal assistant or an access control system, a system for conveying information, like a surveillance system or a medical (imaging) system. A data link 118 may link the processor 110, the storage 112, the interface 108, the device 102 for encoding data, the device 104 for decoding data for communication. The sensor 106 and the interface 108 may be linked by a data link 120.

The apparatus 100 may be configured to make predictions of a trained neural network more robust to nuisance transformations such as lighting or perspective shifts, improving the learned representation, and thereby performance on an end task. The end task may be classifying the sensor data, detecting anomalies, or operating a technical system in a safe mode.

The apparatus 100 may be configured to train a machine learning system that can be used for the above applications and/or to generate training data for such systems.

The specific formulation of the topographic variational autoencoder enables its use for unsupervised representation learning, semi-supervised learning, data generation, and other applications.

The method that is described below comprises steps of a computer implemented method of encoding data and steps of a computer implemented method of decoding data. The method comprises a training of the encoder and the decoder. The training steps are executed in the example for training the encoder and/or the decoder. After the training, i.e. for a trained encoder or decoder, the training steps are optional.

The method comprises encodings with an encoder for encoding sequences of input data points that represent the data.

The method comprises a step 202.

In the step 202, a set of parameters that represent at least a part of the data is provided.

The encoder comprises encoder parameters for mapping the sequence of input data points to sets of parameters. The parameters in one set represent either a mean value of a distribution or a logarithmic standard deviation of the distribution that is determined for an element of a representation of the sequence of input data points in a latent space.

Afterwards a step 204 is executed.

In step 204, a parameter that represents at least a part of the data is provided.

The encoder in the example comprises encoder parameters for mapping one input data point of the sequence of input data points to a plurality parameters that represent either a mean value of a distribution or a logarithmic standard deviation of the distribution for an element of a representation of one input point in the latent space.

Afterwards a step 206 is executed.

In step 206 for parameters in the set of parameters a weighted sum is determined depending on the parameters that is positive.

The method may comprise determining a weighted sum of even powers of the parameters. The method may comprise determining odd powers of absolute values of the parameters. The method may comprise determining even powers of absolute values of the parameters. The even powers are preferably powers of two.

Afterwards a step 208 is executed.

In step 208 an encoding T of the data is determined depending on a ratio between the parameter that represents at least a part of the data and the sum.

The ratio may be determined depending on a difference between the parameter and a mean $\mu$ for this parameter.

The ratio may be determined depending on a root of a predetermined order of the sum. The order of the root is preferably two, i.e. the root is preferably a square root.

The encoder in the example comprises weights for determining the weighted sum.

The encoder in the example is configured with a matrix W that assigns weights to the powers of two of the parameters of the set of parameters. The matrix W may be predetermined, e.g. by a design, as an a priori definition of the topographic structure of a used topographic model or learned in a training.

For topographic models, a global topographic organization may be a set of 1-D tori, i.e. circular capsules. The topographic model may organize its variables as a single 2-D torus instead. Practically, multiplication by the matrix W may be performed by convolution over the appropriate dimensions, i.e. time dimension and capsule dimension, with a kernel of all 1's, and with circular padding to achieve a toroidal structure.

The topographic model may be a topographic generative model, e.g. according to Christopher Bishop, Markus Svensen, and Christopher Williams; "Gtm: The generative topographic mapping;" Neural Computation, 10:215-234, 05 1997, or A. Hyvarinen, J. Hurri, and Jaakko J. Vayrynen; "A unifying framework for natural image statistics: spatiotemporal activity bubbles;" Neurocomputing, 58-60:801-806, 2004, or Aapo Hyvarinen, Patrik O Hoyer, and Mika Inki; "Topographic independent component analysis;" Neural computation, 13(7):1527-1558, 2001, or Simon Kayode Osindero; "Contrastive Topographic Models;" PhD thesis, University of London, 2004, or Max Welling, Simon Osindero, and Geoffrey E Hinton; "Learning sparse topographic representations with products of student-t distributions;" in Advances in neural information processing systems, pages 1383-1390, 2003.

The encoding T comprises capsules of variables. The variables represent characteristics of a topology. Variables in a common capsule represent joint topologies and variables in different capsules represent disjoint topologies. Disjoint topology in this context refers to a relation between the sets of parameters that are used for determining the variables.

The method may comprise determining a first quantity of the encoding T with a first order of the parameters in the set of parameters and determining a second quantity of the encoding T with a second order of the parameters in the set of parameters. The first quantity and the second quantity represent variables in the same capsule and hence represent a joint topology.

The method may comprise determining a third quantity of the encoding T of the data.

The method may comprise determining the third quantity depending on a different set of parameters. The first quantity and the third quantity represent variables in different capsules and hence represent a disjoint topology. The second quantity and the third quantity represent variables in different capsules and hence represent a disjoint topology.

The method may instead comprise determining the third quantity of the encoding T of the data depending on an overlapping set of parameters. The first quantity and the third quantity represent variables in the same capsule when they are both in both sets. Otherwise, they are in different capsules. The first quantity and the second quantity represent variables in the same capsule when they are both in both sets. Otherwise, they are in different capsules.

The steps 202 to 208 are executed in the example based on input data points.

Afterwards, a step 210 is executed.

In step 210 the encoding T of the sequence of input data points is decoded with the decoder.

The method may comprise determining the encoding T for the sequence of input data points. The decoding may comprise mapping the encoding T to a sequence of predicted data points. This is particularly useful in training, where the sequence of predicted data points and the sequence of input data points are used to determine a loss.

The method may comprise determining the encoding T for a previously unseen sequence of input data points. The decoding may comprise mapping the encoding T with the decoder to at least one predicted data point. This is particularly useful in testing or inference, where the at least one predicted data point is used to either reconstruct at least one missing data point in the sequence of input data points or to predict a next data point for continuing the sequence of input data points.

The decoder may comprise decoder parameters for mapping the encoding T of the sequence of input data points to the sequence of predicted data points.

The decoder parameters for the sequence of predicted data points may comprise the decoder parameters for the at least one predicted data point.

The decoder may comprise decoder parameters for mapping the encoding T of the sequence of input data points to the at least one predicted data point.

Afterwards, in particular in training, a step 212 is executed. The step 212 may not be executed in inference or when testing.

In step 212 the weights, the first encoder parameters and/or the second encoder parameters and/or the decoder parameters is determined. The mean p may be learned in training as well.

To train for reconstruction of an input data point in a sequence of input data points, the method may comprise, determining a difference between an input data point at a predetermined position in the sequence and a data point that is predicted at the predetermined position in the sequence of predicted data points.

To train for forward prediction of a data point that extends a sequence of input data points, the method may comprise determining a difference between an input data point at a predetermined position in the sequence and a data point that is predicted for a different position than the predetermined position in the sequence of predicted data points. The different position in training may be a position within the sequence and a next position to the predetermined position in an ascending order of the sequence.

In the training, the weights, the first encoder parameters and/or the second encoder parameters and/or the decoder parameters are determined e.g. with a stochastic gradient descent method. The goal of the training is to iteratively reduce or minimize the difference.

In the training, parameters $\theta$ of a generative model $$p_\theta(x \mid g_\theta(t)) = p_\theta(x \mid g_\theta(z, u))$$

are used to determine an approximate posterior for the variable $t_l$ in terms of a deterministic transformation of approximate posteriors over simpler Gaussian latent variables $u_l$ and $z_l$:

$$q_0(z_l \mid x_l) = M(z_l; \mu_\phi(x_l), \sigma_\phi(x_l)I)$$

$$q_\gamma(u_l \mid x_l) = N(u_l; \mu_\gamma(x_l), \sigma_\gamma(x_l)I)$$

$$t_l = \frac{z_l - \mu}{\sqrt{W[u_{l+L}^2; \dots, u_{l+L}^2]}}$$

wherein l indicates a sequence index of an output of the encoder 102, I indicates the identity matrix, $\mu\phi(x_l)$ the mean value of the distribution N for $x_l$, $\sigma\phi(x_l)$ the standard deviation of the distribution N for $x_l$. The symbols t, z and u represent instantiations of the random variables T, Z, and U, i.e. draw from the corresponding distributions, and $t_l$, $z_l$, & $u_l$ represent the t, z and u encoding of the l'th sequence element.

The parameters $\theta$, $\gamma$, $\Phi$, $\mu$ may be optimized with a sequence $$\{x_l\}_{l=1}^S$$

of S input data points by maximizing the lower bound on the likelihood of the data, given by:

$$\sum_{l=1}^S W_{Q_{\phi,\gamma}(z_l, u_l \mid x_l)}([\log\log p_\theta(x_l \mid g_\theta(t_l))] -$$

$$D_{KL}[q_\phi(z_l \mid x_l) \| p_Z(z_l)] - D_{KL}[q_\gamma(u_l \mid x_l) \| p_U(u_l)])$$

-continued where $$Q_{\phi,\gamma}(z_l, u_l \mid x_l) = q_\phi(z_l \mid x_l) \prod_{\delta=-L}^{L} q_\gamma(u_{l+\delta} \mid x_{l+\delta})$$

5 and $D_{KL}$ is the Kullback-Leibler divergence, $p_z(z_l)$ is a prior probability distribution for $z_l$ and $p_U(u_l)$ is a prior probability distribution for $u_l$.

Steps of the method described above may be executed to process digital images. This will be described below for an example of colored digital images of size 28×28×3, i.e. a height of 28 pixel, a width of 28 pixel and 3 colors, e.g. Red, Green, Blue, wherein the color is coded as a value between 0 and 255.

The sequence $$\{x_l\}_{l=1}^{S}$$

20 of input data points is in this example determined from one input image. That input image is for example randomly sampled from training data. In the example MNIST training data is provided according to Yann LeCun, Corinna Cortes, and C J Burges; "Mnist handwritten digit database;" ATT Labs [Online]. Available: http://yann.lecun.com/exdb/mnist, 2, 2010. Digital images of other sizes may be used as well.

Different training data may be used as well, e.g. dSprites according to Bruno A Olshausen and David J Field; "Sparse coding with an overcomplete basis set: A strategy employed by V1?" Vision research, 37(23):3311-3325, 1997.

An image $x_l$ in the sequence $$\{x_l\}_{l=1}^{S}$$

of input data points is for example determined by rotating the input image in space or in color (hue) space. An object in the input image may be scaled to create an image in the sequence. A X-position or a Y-position of the element in the input image may be changed.

The sequence $$\{x_l\}_{l=1}^{S}$$

of input data points is in the example an input to the encoder 102.

The input image is in the example part of the sequence $$\{x_l\}_{l=1}^{S}$$

of input data points. The sequence $$\{x_l\}_{l=1}^{S}$$

of input data points in the example comprises S=18 images for the MNIST training data, and S=15 for the dSprites training data.

For both the MNIST training data and the dSprites training data, a number S of input images $x_l$ in the sequence $$\{x_l\}_{l=1}^{S}$$

is the same as a number of dimensions of the capsules. For the dSprites training data, a subset of the full dSprites dataset may be used, such that all sequences are of length 15, and scale sequences, originally of length 5, may be looped 3-times to create a sequence of length 15, matching the length of the position and rotation sequences.

The encoder 102 comprises in the example a first part for encoding the sequence $$\{x_l\}_{l=1}^{S}$$

of input data points. In the example, the first part of the encoder 102 comprises 42336 inputs.

The encoder 102 comprises in the example a second part for encoding the input image. In the example, the second part of the encoder 102 comprises 2352 inputs.

The dimensions of the input data points define the sizes of these inputs to the encoder 102. This means, that the sizes of these inputs are set according to the sizes of the digital images.

The first part of the encoder 102 in the example is a neural network. The first part of the encoder 102 in the example comprises a first fully connected layer comprising the 42336 inputs and 972 activations that are activated with a ReLU activation. The first part of the encoder 102 in the example comprises a second fully connected layer comprising inputs for the 972 activations and 648 activations that are activated with a ReLU activation. The first part of the encoder 102 in the example comprises a third fully connected layer comprising inputs for the 648 activations with no subsequent nonlinearity.

An activation of the third layer in the example represents either a mean value for a distribution or a logarithmic standard deviation for the distribution. In the example, the first part of the encoder 102 is configured for learning the parameters, i.e. pairs of mean value and logarithmic standard deviation, of 324 distributions.

The second part of the encoder 102 in the example is a neural network. The second part of the encoder 102 in the example comprises a first fully connected layer comprising the 2352 inputs and 972 activations that are activated with a ReLU activation. The second part of the encoder 102 in the example comprises a second fully connected layer comprising inputs for the 972 activations and 648 activations that are activated with a ReLU activation. The second part of the encoder 102 in the example comprises a third fully connected layer comprising inputs for the 648 activations with no subsequent nonlinearity. An activation of the third layer in the example represents either a mean value for a distribution or a logarithmic standard deviation for the distribution. In the example, the second part of the encoder 102 is configured for learning the parameters, i.e. pairs of mean value and logarithmic standard deviation, of 324 distributions.

The distributions in the example are normal Gaussian distributions. Other distributions may be used as well.

The encoder 102 comprises a third part, that is configured for mapping the activations of the third layer of the first part of the encoder 102 and the activations of the third layer of the second part of the encoder 102 to the representation.

In the example, the third part of the encoder 102 is configured to determine the powers of two of the activations of the third layer of the first part of the encoder 102 that represent mean values. In the example the third part of the encoder 102 is configured with the Matrix W to map the powers of two of activations of the third layer of the first part of the encoder 102 to a plurality of sums according to a rule that is encoded in the Matrix W. In the example, the third part of the encoder 102 is further configured to determine the representation depending on a plurality of ratios between pairs comprising an activation of the third layer of the second part of the encoder 102 and a sum of the plurality of sums.

The third part of the encoder 102 may comprise a neural network that is configured to execute these operations.

In the example, an index of a given activations of the third layer of the second part of the encoder 102 identifies an index of activations of the third layer of the first part of the encoder 102 that are used for determining the sum. The activation of the last layer of the second part of the encoder 102 is the parameter that represents at least a part of the data. The activation of the third layer of the first part of the encoder 102 is the set of parameters that represent at least a part of the data. In the example, the matrix W identifies the activations of the third layer of the first part of the encoder 102, that are used for determining the sum for the given activation of the third layer of the second part of the encoder 102.

In the example a predetermined amount of activations of the third layer of the first part of the encoder 102 is used for determining the sum. This corresponds to a window size. In the example, a set of 20 activations of the third layer of the first part of the encoder 102 are used to determine the sum. In the example, the index of the given activation is selected to be in the center of the index of the set of the 20 activations.

The window size, the size of the input data points and the length S of the sequence $$\{x_l\}_{l=1}^{S}$$

may be different.

The matrix W has a temporal dimension and a capsule dimension. In the example, an equal number of internal capsule dimensions, i.e. units per capsule, and temporal dimensions, i.e. units per sequence, are used. The number of internal capsule dimensions may be different than the number of temporal dimensions. In the example, the length S of the sequence $$\{x_l\}_{l=1}^{S}$$

is equal to the number of temporal dimensions.

The configuration of the third part of the encoder 102 for processing the activations at a single time step is $$W[U_{l+L}^2; \dots, U_{l-L}^2] = \sum_{\delta=-L}^{L} W_\delta \mathrm{Roll}_\delta(U_{l+\delta}^2)$$

wherein L is the half of the window size 2L and $$\mathrm{Roll}_\delta(U_{l+\delta}^2)$$

denotes a cyclic permutation of $\delta$ steps along the internal capsule dimension of variables $U_{l+\delta}$. The matrix $W_\delta$ in the example is identical for the time steps. In this example, the capsules are 1-dimensional tori, i.e. circular capsules.

The choice of the matrix $W_\delta$ determines a local topographic structure within a single time step. For a topographic model with L>0 a local neighborhood size K may comprise a plurality of units, e.g. 1 unit for MNIST training or 3 units for dSprites training. This means that the matrix $W_\delta$ comprises convolutional kernels that effectively have the size K in the internal capsule dimensions. Equivalently, the full matrix W can be seen as a convolution over both the internal capsule dimension and the time dimension, where the input at each time-step l+$\delta$ is rolled by $\delta$ steps along the internal capsule dimension. The kernel size of this convolution is then K in the internal capsule dimension, and 2L in the time dimension.

Smaller or larger neighborhood sizes K>1 may be used as well.

For a topographic variational autoencoder model with L=0, $W_\delta$=W may be fixed to sum over neighborhoods of size K=9 for the MNIST training and K=10 for the dSprites training.

The cyclic permutation is achieved in the example by an operation $$\mathrm{Roll}_\delta(u) = \mathrm{Roll}_\delta([u_1, u_2, \dots, u_{C \cdot D}]) = [u_D,$$
$$u_1, \dots, u_{D-1}, u_{D+1}, \dots, u_{2 \cdot D-1}, U_{3 \cdot D}, \dots, \dots, u_{C \cdot D-1}]$$

wherein u is divided into C capsules each with D internal dimensions.

The Roll operation defines a speed at which a representation t transforms corresponding to an observed transformation. For example, with the Roll defined as above, it is implicitly provided, that the representation t permutes cyclically by 1-unit within the capsule for each observed time step. For this to match the observed input data points, it requires the encoder 102 to have an equal number of internal capsule dimensions and elements S in the sequence $$\{x_l\}_{l=1}^{S}.$$

To reduce the size of the representation t, a partial permutation may be applied for the observed transformations. For a single capsule with D elements, an example of a simple linear version of such a partial permutation for $0<\alpha\leq1$ may be implemented as:

$$\mathrm{Roll}_\alpha(u) = [\alpha u_D + (1-\alpha)u_1, \alpha u_1 + (1-\alpha)u_2 \dots, \alpha u_{D-1} + (1-\alpha)u_D]$$

The weights in the matrices of each layer of the encoders and decoders may be normalized by reparametrizing weight vectors, i.e. rows $w_i$ of W, as a product of a normalized vector $v_i$ and a skalar $g_i$:

$$w_i = g_i \cdot \frac{v_i}{\|v_i\|_2}$$

$$U\left(-\frac{1}{\sqrt{m}}, \frac{1}{\sqrt{m}}\right)$$

Weight normalization may be applied at some or all of the layers.

The choice of the half L of the window size determines an extent of a temporal coherence.

The half L of the window size may be set approximately to a third of the length S of sequence $$\{x_l\}_{l=1}^S.$$

The half L of the window size may be set larger or equal to the third of the length S of the sequence $$\{x_l\}_{l=1}^S.$$

The latent space may be grouped as in the example into 18 capsules.

The resulting 324 variables $t_l$ are in this case divided into the 18 capsules each of 18 dimensions.

The decoder 104 in the example comprises 324 inputs, i.e. one input per variable $t_l$. The decoder 104 in the example comprises a first fully connected layer comprising the 324 inputs and 648 activations that are activated with a ReLU activation. The decoder 104 in the example comprises a second fully connected layer comprising inputs for the 972 activations and 972 activations that are activated with a ReLU activation. The decoder 104 in the example comprises a third fully connected layer comprising inputs for the 648 activations and 2352 activations that are activated with a Sigmoid activation. An activation of the third layer in the example represents a mean probability for a pixel of image to be reconstructed. In the example, the decoder 104 is configured for predicting the mean probability for the 2352 pixels of the image.

A different number of capsules may be used as well, e.g. 15 capsules may be used when training with the dSprites training data.

For the dSprites training, the encoder 102 may be configured with the first part and the second part having 674 outputs at the first layer 674, 450 outputs at the second layer and 450 outputs at the third layer. The resulting 225 variables $t_l$ are in this case divided into the 15 capsules each of 15 dimensions. In the dSprites training, the decoder 104 comprises 225 inputs and 450 activations at its first layer, 450 inputs for these activations and 675 activations at its second layer, and 675 inputs for these activations and 4096 activations at its third layer.

The method may be used to train a deep topographic generative model to learn capsules, i.e. equivariant sets of features, directly from sequences of input data points with no other supervision. The trained model comprises learned transformations. The learned transformations may be used to generate output data that predicts for a sequence of input images a next image or that reconstructs an input image that is missing in a sequence of input images.

The weights of the models, i.e. the parts of the encoder 102 and the decoder 104, may be initialized with uniformly random samples from where m is the number of inputs. μ may be initialized to a positive value, for example in a range between 1 and 50, e.g. μ=5, μ=30.0. A larger value of p may increase the speed of convergence of the training as compared to a smaller value of μ.

The steps of the method may be repeated in training to process training data e.g. until convergence.

Figure 3:
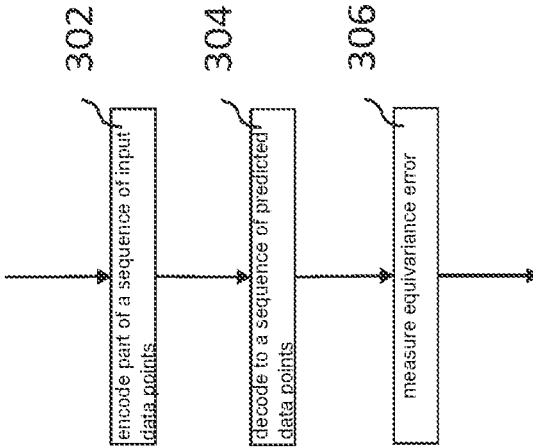
FIG. 3 depicts steps in a method for evaluating the apparatus, according to an example embodiment of the present invention.

FIG. 3 depicts steps in a method of evaluating the apparatus 100.

The method of evaluating the apparatus 100 uses capsule traversals to qualitatively visualize transformations that are learned by the apparatus. In the example the neural networks of the encoder 102 and the decoder 104 are evaluated.

The transformations are constructed in a step 302 by encoding a part of a sequence $$\{x_l\}_{l=1}^S$$

of input data points into a $t_l$ variable.

Afterwards, a step 304 is executed.

In the step 304, this variable $t_l$ is decoded to a sequence of predicted data points.

Afterwards, a step 306 is executed.

In step 306, an equivariance error is measured. This means, the equivariance is measured quantitatively. In the example the equivariance error is defined for the length S of the sequence $$\{x_l\}_{l=1}^S$$

of $$\varepsilon_{eq}\left(\{t_l\}_{l=1}^S\right) = \sum_{l=1}^{S-1} \sum_{\delta=1}^{S-l} \left\|\mathrm{Roll}_\delta(\hat{t}_l) - \hat{t}_{l+\delta}\right\|_1$$

wherein $\hat{t}_l = t_l / \|t_l\|_2$

The equivariance error provides a measure precision.

The method may comprise measuring a degree to which observed transformations in input space are correlated with transformations in capsule space, i.e. variables $t_l$.

A metric CapCorr for measuring the degree computes a correlation at two time steps l and l+δ

$$CapCorr(t_l, t_{l+\delta}, y_l, y_{l+\delta}) = \mathrm{Corr}(\mathrm{argmax}[t_l * t_{l+\delta}], |y_l - y_{l+\delta}|)$$

wherein Corr is a correlation coefficient and * is a discrete cross correlation across the internal capsule dimension of $t_l$, and the argmax returns the index of the maximum value of this cross correlation in the internal capsule dimension.

For measuring the metric on a model which does not have capsules, a latent space may be divided into a fixed set of corresponding capsules and capsule dimensions.

The argmax of the cross-correlation is an estimate of a degree to which a capsule activation has shifted from time 13
14

1 to l+δ. To extend this to multiple capsules, the argmax function may be replaced with a mode of the argmax computed for all capsules.

An example for implementing the metric CapCorr is described below.

A ground truth transformation parameter of the sequence $$\{x_l\}_{l=1}^{S}$$

at time step l is denoted $y_l$. The transformation parameter $y_l$ may be a rotation angle at time step l in a sequence $$\{x_l\}_{l=1}^{S}$$

that is created by rotating the input image $x_l$.

The corresponding activation at time l is denoted as $t_l$. l=Ω denotes a time step when $y_l$ is at a canonical position. The canonical position in the example is a position of e.g. a rotation angle 0, X-position 0, or scale 1.

In the example, Ω is not necessarily 0 because the first input data point in the sequence $x_1$ is randomly sampled from the data.

An approximate observer roll in the capsule dimension between time 0 and Ω is in the example computed by a function ObservedRoll:

$$ObserverdRoll(t_\Omega, \ t_0) = \mathrm{argmax}[t_\Omega * t_0]$$

wherein argmax is subsequently performed over the capsule dimension and wherein * is a discrete cross correlation across the capsule dimension. In the example * is a discrete periodic cross correlation across the cyclic capsule dimension.

Considering this, the CapCorr metric for a single capsule is $$CapCorr(t_\Omega, \ t_0, \ y_\Omega, \ y_0) = Corr(ObserverdRoll(t_\Omega, \ t_0), \ |y_\Omega - y_0|)$$

The correlation coefficient Corr is computed in the example across all examples for the entire dataset. The Pearson correlation coefficient may be used for the correlation coefficient Corr. This metric is the correlation of an estimated observed capsule roll with a shift in ground truth generative factors, which is equal to 1 when a model is perfectly equivariant.

To extend this definition to multiple capsules, the ObservedRoll may be estimated for each capsule separately, and then the mode of all ObservedRoll values may be correlated with the true shift in ground truth generative factors.

For transformation sequences which have multiple time steps where $y_l$ is at the canonical position l=Ω is selected to be the one from this possible set which yields the minimal absolute distance between $\|y_\Omega - y_0\|$ and ObservedRoll($t_\Omega$, $t_0$).

Such transformation sequences are for example scale transformations on the dSprites data where the scale is looped 3 times.

The example demonstrates a global topographic structure where the capsules are each organized into 1-dimensional tori, i.e. flat circles. It is also possible to define a topographic structure where the capsules are 2 or D>2 dimensional tori. In such a setting, when L=0, this is simply achieved by defining the matrix $W_\delta$ to be a 2-dimensional convolution over the variables U organized into a 2-dimensional lattice. When L>0, it must be considered how the roll operation acts for each sequence element. In this setting, the Roll operation may be executed over each dimension of the lattice separately, for each sequence element, ultimately summing over all dimensions. The activations for the encoding $T_l$ are thus constructed as follows where the variables $U_l$ are organized into a D dimensional lattice, and $W^{d}_\delta$ is a matrix which sums locally over the d'th dimension of the lattice, i.e. a 1-d convolution over the d'th dimension of the lattice. The function $Roll^{d}_\delta$ also rolls δ steps locally along the d'th dimension of the lattice only.

$$T_l = \frac{Z_l - \mu}{\sum_{d=1}^{D} \sqrt{W^d[U_{l+L}^2; \ldots, U_{l-L}^2]}} = \frac{Z_l - \mu}{\sum_{\delta=-L}^{L} W_\delta^d \mathrm{Roll}_\delta^d(U_{l+\delta}^2)} =$$

The invention claimed is:

1. A computer implemented method of encoding data, the method comprising the following steps:

providing a first set of parameters that represent at least a part of the data;

determining for parameters in the first set of parameters, a weighted first sum, depending on the parameters in the first set of parameters, that is positive;

providing a first parameter that represents at least a part of the data;

determining an encoding of the data depending on a ratio between the first parameter and either the first sum or a root of a predetermined order of the first sum;

providing a second set of parameters;

determining for parameters in the second set of parameters a weighted second sum, depending on the parameters in the second set of parameters, that is positive;

providing a second parameter;

mapping the first set of parameters and/or the second set of parameters to the encoding with an encoder including weights for determining the weighted first sum and/or the weighted second sum; and training with data that includes input data points, wherein the training includes determining with the encoder an encoding for a sequence of input data points, mapping the encoding of the sequence of input data points with a decoder to a sequence of predicted data points, wherein the encoder includes first encoder parameters for mapping the sequence of input data points to the first set of parameters and to the second set of parameters, wherein the encoder includes second encoder parameters for mapping the sequence of input data points to the first parameter and to the second parameter, and wherein the method further comprises determining the weights and/or the first encoder parameters and/or the second encoder parameters depending on a difference between an input data point at a predetermined position in the sequence and a data point that is predicted at the predetermined position in the sequence of predicted data points or depending on a difference between an input data point at a predetermined position in the sequence and a data point that is predicted for a different position than the predetermined position in the sequence of predicted data points.

2. The method of encoding according to claim 1, wherein the determining of the weighted first sum includes determining the weighted first sum of: i) even powers of the parameters, or ii) odd powers of absolute values of the parameters, or iii) even powers of the absolute values.

3. The method of encoding according to claim 1, wherein the method further comprises:

determining a first quantity of the encoding of the data with a first order of the parameters in the first set of parameters; and determining a second quantity of the encoding of the data with a second order of the parameters in the first set of parameters.

4. The method of encoding according to claim 3, the method further comprising:

determining a third quantity of the encoding of the data depending on a ratio between the second parameter and the second sum or a root of the predetermined order of the second sum.

5. The method according to claim 1, wherein the data includes a plurality of input data points, wherein each input data point represents a sensor signal or a digital image, wherein the method further comprises:

receiving the input data points from or capturing the input data points by a sensor, the sensor including an image sensor, and/or a video sensor, and/or a radar sensor, and/or a LiDAR sensor, and/or an ultrasonic sensor, and/or a motion sensor, and determining a representation of the input data points, and/or determining at least one predicted data point by decoding the representation thereof and determining a control signal depending on the at least one predicted data point for a physical system, the physical system including a computer-controlled machine, or a robot, or a vehicle, or a domestic appliance, or a power tool, or a manufacturing machine, or a personal assistant, or an access control system, or a system for conveying information, or a surveillance system, or a medical system, or a medical imaging system.

6. A method of decoding data, the method comprising:

determining an encoding for data, the data including a sequence of input data points, the encoding including:

providing a first set of parameters that represent at least a part of the data, determining for parameters in the first set of parameters, a weighted first sum, depending on the parameters in the first set of parameters, that is positive, providing a first parameter that represents at least a part of the data, and determining an encoding of the data depending on a ratio between the first parameter and either the first sum or a root of a predetermined order of the first sum;

mapping the encoding with a decoder to at least one data point, wherein the decoder includes decoder parameters for mapping the encodings of the sequence of input data points to at least one predicted data point; and training with data that includes input data points, wherein the training includes determining with an encoder an encoding for a sequence of input data points, mapping the encoding of the sequence of input data points with the decoder to a sequence of predicted data points, wherein the decoder includes decoder parameters for mapping the encodings of the sequence of input data points to the sequence of predicted data points, and wherein the method further comprises determining the decoder parameters depending on a difference between an input data point at a predetermined position in the sequence and a data point that is predicted at the predetermined position in the sequence of predicted data points or depending on a difference between an input data point at a predetermined position in the sequence and a data point that is predicted for a different position than the predetermined position in the sequence of predicted data points.

7. A device for encoding data, the device comprising:

an encoder configured to:

provide a first set of parameters that represent at least a part of the data;

determine for parameters in the first set of parameters, a weighted first sum, depending on the parameters in the first set of parameters, that is positive;

provide a first parameter that represents at least a part of the data; determine an encoding of the data depending on a ratio between the first parameter and either the first sum or a root of a predetermined order of the first sum;

provide a second set of parameters;

determine for parameters in the second set of parameters a weighted second sum, depending on the parameters in the second set of parameters, that is positive;

provide a second parameter;

map the first set of parameters and/or the second set of parameters to the encoding with the encoder including weights for determining the weighted first sum and/or the weighted second sum; and train with data that includes input data points, wherein the training includes determining with the encoder an encoding for a sequence of input data points, mapping the encoding of the sequence of input data points with a decoder to a sequence of predicted data points, wherein the encoder includes first encoder parameters for mapping the sequence of input data points to the first set of parameters and to the second set of parameters, wherein the encoder includes second encoder parameters for mapping the sequence of input data points to the first parameter and to the second parameter, and wherein the weights and/or the first encoder parameters and/or the second encoder parameters are determined depending on a difference between an input data point at a predetermined position in the sequence and a data point that is predicted at the predetermined position in the sequence of predicted data points or depending on a difference between an input data point at a predetermined position in the sequence and a data point that is predicted for a different position than the predetermined position in the sequence of predicted data points.

8. A device for decoding data, the device comprising:

an encoder configured to:

provide a first set of parameters that represent at least a part of the data, the data including a sequence of input data points;

determine for parameters in the first set of parameters, a weighted first sum, depending on the parameters in the first set of parameters, that is positive;

provide a first parameter that represents at least a part of the data; and determine an encoding of the data depending on a ratio between the first parameter and either the first sum or a root of a predetermined order of the first sum; and a decoder configured to map the encoding to at least one data point, wherein the decoder includes decoder parameters for mapping encodings of the sequence of input data points to at least one predicted data point, and wherein the encoder is further configured to train with data that includes input data points, wherein the training includes determining with the encoder an encoding for a sequence of input data points, mapping the encoding of the sequence of input data points with the decoder to a sequence of predicted data points, wherein the decoder includes decoder parameters for mapping the encodings of the sequence of input data points to the sequence of predicted data points, and wherein the decoder parameters are determined depending on a difference between an input data point at a predetermined position in the sequence and a data point that is predicted at the predetermined position in the sequence of predicted data points or depending on a difference between an input data point at a predetermined position in the sequence and a data point that is predicted for a different position than the predetermined position in the sequence of predicted data points.

9. A non-transitory storage medium on which is stored a computer program including machine readable instructions for encoding data, the instructions, when executed by a computer, causing the computer to perform the following steps:

providing a first set of parameters that represent at least a part of the data;

determining for parameters in the first set of parameters, a weighted first sum, depending on the parameters in the first set of parameters, that is positive;

providing a first parameter that represents at least a part of the data;

determining an encoding of the data depending on a ratio between the first parameter and either the first sum or a root of a predetermined order of the first sum;

providing a second set of parameters;

determining for parameters in the second set of parameters a weighted second sum, depending on the parameters in the second set of parameters, that is positive;

providing a second parameter;

mapping the first set of parameters and/or the second set of parameters to the encoding with an encoder including weights for determining the weighted first sum and/or the weighted second sum; and training with data that includes input data points, wherein the training includes determining with the encoder an encoding for a sequence of input data points, mapping the encoding of the sequence of input data points with a decoder to a sequence of predicted data points, wherein the encoder includes first encoder parameters for mapping the sequence of input data points to the first set of parameters and to the second set of parameters, wherein the encoder includes second encoder parameters for mapping the sequence of input data points to the first parameter and to the second parameter, and wherein the weights and/or the first encoder parameters and/or the second encoder parameters are determined depending on a difference between an input data point at a predetermined position in the sequence and a data point that is predicted at the predetermined position in the sequence of predicted data points or depending on a difference between an input data point at a predetermined position in the sequence and a data point that is predicted for a different position than the predetermined position in the sequence of predicted data points.

* * * * *